Patented July 8, 1952

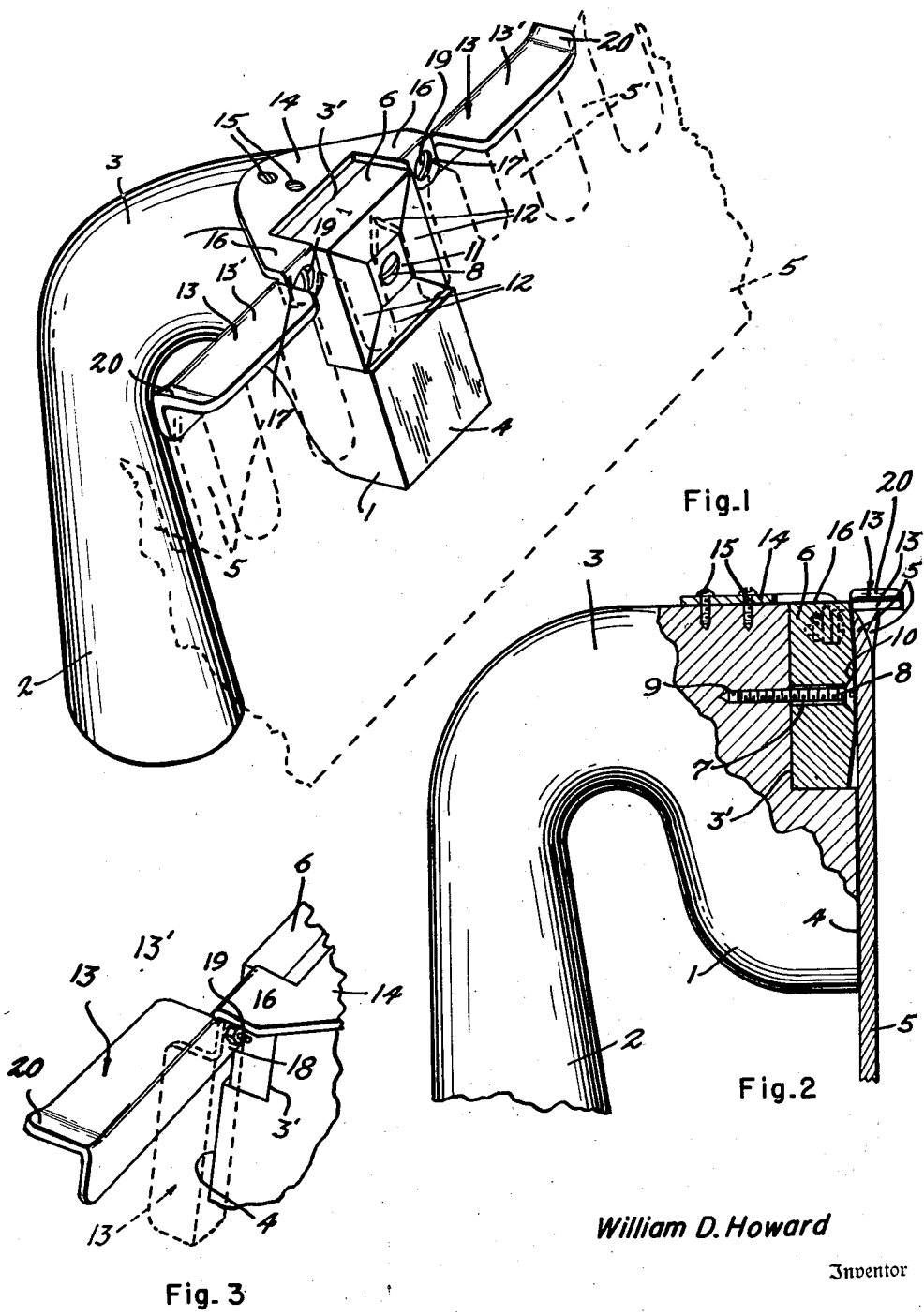

2,602,355

UNITED STATES PATENT OFFICE 2,602,355

SAW SETTING TOOL

William D. Howard, Smelterville, Idaho

Application February 26, 1951, Serial No. 212,759

2 Claims. (Cl. 76—73)

This invention relates to a saw setting tool and it is one object of the invention to provide a tool of such construction that the teeth of a saw may be accurately set at a predetermined angle according to whether the saw is to be used for cutting hard wood or soft wood, the teeth being set at a slight angle for cutting hard wood and at a greater incline for cutting soft wood.

Another object of the invention is to provide a saw set including an anvil having tooth engaging surfaces formed at different angles, the anvil being removably mounted so that it may be turned to adjusted positions for presenting a predetermined angular surface in position for use and then firmly secured in the desired position.

Another object of the invention is to provide a saw setting tool having a head or body formed at its front with a recess in which an anvil is removably mounted, the tool having a handle extending downwardly back of its head or body in such position that the tool may be readily held with one hand while teeth of a saw are being swaged or set.

Another object of the invention is to so construct the tool that while the anvil may be easily moved to positions adjusted positions for presenting a desired angularly disposed surface in a tooth-engaging position, the anvil will be prevented from moving out of an adjusted position during use of the tool.

Another object of the invention is to provide the saw setting tool with guides which rest upon teeth of a saw and allow the tool to be accurately supported upon the saw and also allow the tool to be readily slid along the saw from one tooth to another during a setting operation.

Another object of the invention is to provide a saw setting tool which is of simple construction, easy to operate, and of such size that it may be placed in a tool box when not in use without occupying much space in the tool box.

The invention is illustrated in the accompanying drawings wherein:

Fig. 1 is a perspective view of the improved saw setting tool.

Fig. 2 is a view showing the saw setting tool partially in elevation and partially in vertical section.

Fig. 3 is a fragmentary perspective view showing one of the guide plates of the tool in an extended position for use and also showing this guide plate in a folded position by dotted lines.

This improved saw setting tool has a head or body 1 which is formed of solid metal and has a handle 2 disposed vertically back of the head and at its upper end curved forwardly to form a neck 3 integrally united with the upper portion of the head 1. The forward portion of the head is formed with a recess 3' open at its top and along its front and below this recess the head has a flat front surface 4 extending the full width of the head so that the tool may be disposed flat against a side face of a saw 5 while teeth of the saw are being set.

An anvil 6 having the form of a rectangular block of hard metal, such as steel or the like, fits snugly in the recess or seat 3 and at its center is formed with an opening 7 to receive a screw 8 which passes through this opening and into a threaded socket 9 formed in the head and leading from the rear wall of the recess, as shown in Figure 2. The outer end 10 of the opening 7 is enlarged so that the head of the screw will be counter-sunk and thus flush with the center portion 11 of the anvil and not form an obstruction which would interfere with flat face to face engagement of the front surface 4 of the head 1 with a confronting side face of a saw. About its central surface 11 the anvil is formed with sloping surfaces 12 extending longitudinally of edges of the anvil for the full length thereof and disposed at a transverse incline for the full distance between edges of the rectangular center surface 11 and the marginal edges of the anvil. These sloping surfaces are disposed at different angles and when the tool is in use the anvil will be fitted into the recess or seat with a selected inclined surface 12 at its upper end. As the teeth of the saw are set by being struck with a hammer and bent into flat contacting engagement with the upper surface 12 it is obvious that by fitting the anvil into the recess or seat with a selected surface 12 across its upper end the teeth of the saw may be swaged and set at a predetermined angle, according to whether the teeth are to be set at a slight angle for cutting hard wood or at a steeper incline for cutting soft wood.

When the tool is in use it is grasped by its handle 2 with one hand and thus held in place with the front surface 4 of its head in flat face to face engagement with the saw 5. A tooth in front of the anvil is then struck with a hammer and bent rearwardly until it is in flat face to face contact with the upper surface 12 of the anvil. The tool is then shifted along the saw a distance of two teeth and the setting operation repeated. The saw is firmly held in a saw-holding vice while the teeth are being set. When an end of the saw is reached the operator transfers the tool from one side of the saw to its other side and again sets every other tooth. It will thus be seen that alternate teeth are bent in opposite directions while being set.

In order to support the tool in its proper position back of the saw and allow it to be readily slid along the saw from one tooth to another and the teeth all bent the same distance from their upper free ends there have been provided guides or supports 13 which are formed of angle metal and have forwardly projecting flanges 13' along their upper edges. A sheet metal plate or bracket 14 is secured upon the upper surface of the head or body 1 by screws 15 and has arms 16 which project forwardly at opposite sides of the recess 3 and have front end portions bent downwardly to form ears 17 with which ears or tongues 18 at inner ends of the supports 13 are pivotally connected by bolts 19. When the supports are swung downwardly and inwardly to a folded position they are disposed longitudinally of the head along opposite sides thereof, as indicated by dotted lines in Figure 3, and when they are moved to an extended position they extend horizontally from the upper end of the head and are held in the horizontal position by engagement of their tongues with under faces of the arms 16 of the bracket. With the supports in the extended position their flanges 13' may rest upon ends of the teeth 5' of the saw 5 and the lower edge of the upwardly disposed inclined surface 12 of the anvil will cross all of the teeth at the same distance from ends thereof as the setting tool is moved along the saw. Therefore the teeth will all be bent transversely the same when struck by a hammer during a setting or swaging operation. Outer ends of the flanges 13' are curved upwardly to form lips 20 which allow the supports to slide easily along the teeth as the tool is moved along the saw.

Having thus described the invention, what is claimed is:

1. A saw setting tool comprising a body having a head formed at its front with a recess open along its front and at its upper end, there being a vertical saw-engaging surface at the front of the head below the open front of said recess, an anvil consisting of a rectangular block removably mounted in said recess and resting upon the bottom of the recess, and gauges at opposite sides of said head consisting of strips of angle metal pivotally mounted at inner ends for movement from a folded position close to the head at opposite sides of the recess to an extended horizontally disposed position in which they project from opposite sides of the head in position for resting upon ends of teeth of a saw, said plates having flanges for engaging side faces of the saw teeth and other forwardly projecting flanges for resting upon free cutting ends of the said saw teeth.

2. A saw setting tool comprising a body having a head and a handle integral with the head and extending rearwardly from and downwardly back of the head in spaced relation thereto, said head being formed at its front with a recess leading from its upper end and open at its front and along its sides, there being a flat vertically disposed saw-engaging surface below the open front of said recess extending the full width of the head, an anvil removably mounted in said recess and resting upon the bottom of the recess and corresponding in width to the recess, a bracket secured upon the top of said head and consisting of a rectangular block having arms extending forwardly along opposite sides of the recess and provided with depending fingers at their front ends engaging opposite sides of the anvil, and angle shaped gauge members having rear flanges pivoted at inner ends to said fingers for swinging movement from a folded position close to the recess outwardly and upwardly to an extended horizontal position and carrying forwardly extending flanges for resting upon ends of the teeth of a saw when the gauge members are in the extended position.

WILLIAM D. HOWARD.

REFERENCES CITED

The following references are of record in the file of this patent:

UNITED STATES PATENTS

| Number | Name | Date |
| --- | --- | --- |
| 18,957 | Cook | Dec. 29, 1857 |
| 134,320 | Shoemaker | Dec. 24, 1872 |
| 261,687 | Coxhead | July 25, 1882 |
| 355,692 | Harris | Jan. 11, 1887 |
| 613,817 | Henderson | Nov. 8, 1898 |
| 1,005,688 | Burnham | Oct. 10, 1911 |
| 1,059,347 | Chainey | Apr. 22, 1913 |
| 1,159,974 | Martin | Nov. 9, 1915 |
| 1,505,260 | Hanson | Aug. 19, 1924 |
| 1,609,669 | Stacy | Dec. 7, 1926 |
| 2,432,269 | Andrus | Dec. 9, 1947 |
| 2,460,388 | Lezanski | Feb. 1, 1949 |